United States Patent [19]

Yano et al.

[11] Patent Number: 4,480,849
[45] Date of Patent: Nov. 6, 1984

[54] WHEEL PLATE

[75] Inventors: Mitsuru Yano, Fukuoka; Akira Inoue, Kitakyushu, both of Japan

[73] Assignee: Hitachi Metals, Ltd., Tokyo, Japan

[21] Appl. No.: 410,660

[22] Filed: Aug. 23, 1982

[30] Foreign Application Priority Data

Aug. 26, 1981 [JP] Japan ................................ 56-133746

[51] Int. Cl.³ .............................................. B62D 53/08
[52] U.S. Cl. .................................... 280/433; 384/123; 384/370; 384/421
[58] Field of Search ................ 280/433; 384/123, 305, 384/307, 370, 421, 422

[56] References Cited

U.S. PATENT DOCUMENTS 2,362,667 11/1944 Schmidt .............................. 384/305
3,887,251 6/1975 McKay ................................ 280/433

FOREIGN PATENT DOCUMENTS 51-79820 6/1976 Japan .

Primary Examiner—Joseph F. Peters, Jr.
Assistant Examiner—D. Lynn Fugate
Attorney, Agent, or Firm—Antonelli, Terry & Wands

[57] ABSTRACT

A wheel plate of a coupler for coupling a tractor and a trailer. The wheel plate has a lubricating arrangement for lubricating the sliding surfaces in the coupling. The lubricating arrangement includes a main groove formed in a central portion of the sliding surface of the wheel plate and surrounding the pivot shaft of the coupler, and a plurality of convolution grooves formed in the sliding surface of the wheel plate along convolution curves starting from and surrounding the main groove. The convolution grooves are communicated at their both ends with the main groove.

5 Claims, 3 Drawing Figures

WHEEL PLATE

BACKGROUND OF THE INVENTION

The present invention relates to a wheel plate of a coupler for use in coupling a trailer and a tractor and, more particularly, to a wheel plate provided with lubricant groove device for lubricant, suitable for use in the coupler of a trailer-tractor in which coupling and uncoupling operation is not frequently made.

Systems for coupling a trailer and a tractor are divided broadly into two type conneting systems. One of these known systems is so-called semi-trailer type connecting system in which a part of the weight of the trailer is born directly by the tractor. This type of connecting system incorporates a connecting mechanism referred to as coupler. More specifically, the coupler is provided thereon with a wheel plate which, in turn, slidably carries an upper plate fixed to the lower side of the trailer. At the same time, a king pin prvided at the lower side of the trailer rotatably engages with the coupler to permit a relative pivotal movement between the tractor and the trailer. The wheel plate is provided in its upper surface with lubricant groove device for lubricant to lubricate the sliding surfaces of the wheel plate and the upper plate to smooth the relative pivotal movement between the tractor and the trailer.

In the conventional wheel plate, the lubricant groove device is composed of a combination of a circular or oval groove and a plurality of radial grooves. This form of lubricant groove device, however, has no definite theoretical support and, hence encounters the following problems. First of all, it is to be pointed out that the lubricant does not move smoothly when the trailer-tractor is steered to the left or right. In addition, this form of lubricant groove device does not permit an easy spreading and dispersion of the lubricant to the sliding surfaces. Therefore, it is often experienced that the oil film between the wheel plate and the upper plate is broken to cause an undesirable phenomenon called seizure, unless the trailer and the tractor is frequently uncoupled for application of the lubricant. As the state of the seizure is developed further, the smooth running and steering are lost to impose a danger in the running of the trailer-tractor.

SUMMARY OF THE INVENTION

Accordingly an object of the invention is to provide an improved wheel plate of a coupler for use in coupling a trailer and a tractor which ensures a good lubrication between the sliding surfaces to prevent any seizure in the coupling.

To this end, according to the invention, there is provided a device for lubricating a couping between a trailer and a tractor, comprising a main groove formed in the central part of the sliding surface of the wheel plate so as to surround the axis of pivot shaft for relative pivotal movement between the tractor and the trailer, and a plurality of convolution grooves starting from the main groove and surrounding the same, the convolution grooves being communicated at their ends with the main groove.

The above and other objects, features and advantages of the invention will become clear from the following description of the preferred embodiments taken in conjunction with the accompanying drawings.

DETAILED DESCRIPTION OF THE PREFERRED EMBODIMENTS

Figure 1:
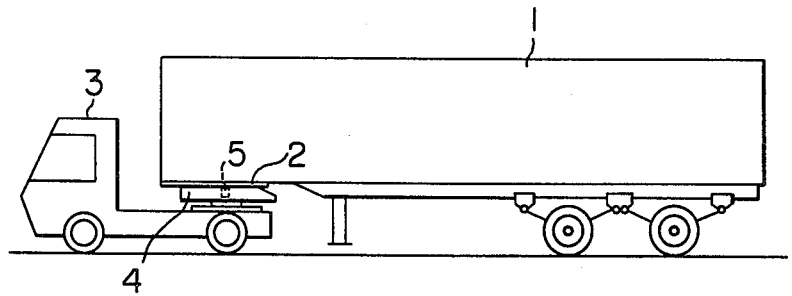
FIG. 1 is a schematic side elevational view showing the connection between a tractor and a trailer.

As shown in FIG. 1, in the semi-trailer type connection system between a trailer 1 and a tractor 3, an upper plate 2 secured to the lower side of the trailer 1 is mounted on a wheel plate 4 of a coupler mounted on the tractor 3, and the coupler is engaged by a king pin 5 to couple the trailer 1 to the tractor 3.

Figure 2:
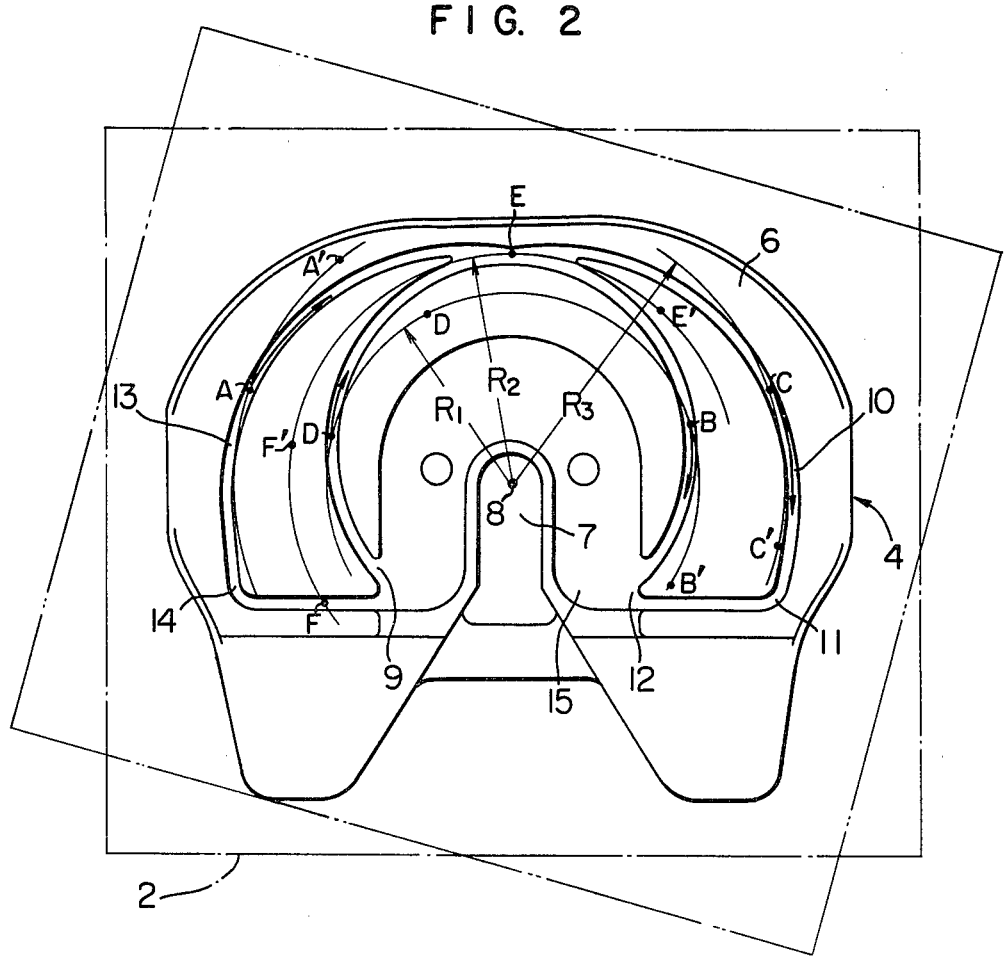
FIGS. 2 and 3 are plan views showing different forms of lubricant groove devices in accordance with different embodiments of the invention.

As shown in FIG. 2, the wheel plate 4 is casted from a medium carbon steel. A pivot shaft around which the trailer 1 and tractor 3 rotate or pivot relatively to each other, i.e. a king pin provided on the trailer 1, is adapted to be received by a hole or recess 7 formed in the central portion of the wheel plate 4. A recess or main groove 15 is formed in the upper surface of the wheel plate 6 during casting thereof, so as to surround the recess 7 for receiving the shaft. At the same time, convolution grooves 10 and 13 are formed to extent along two involute curves in the opposite directions starting from the main groove 15. These involute curves have a common base circle centered at the axis of the pivot shaft and start from points on the common base circle symmetrical with each other with respect to an axis of symmetry plane of the wheel plate passing the axis 8. Therefore, two convolution grooves 10 and 13 are arranged in symmetry with each other with respect to the axis of symmetry plane of the wheel plate 4. The grooves 10 and 13 communicate directly with the main groove 15 at their one ends 9 and 12 while their other ends 11 and 14 indirectly communicate with the main groove 15 though linear grooves.

Figure 3:
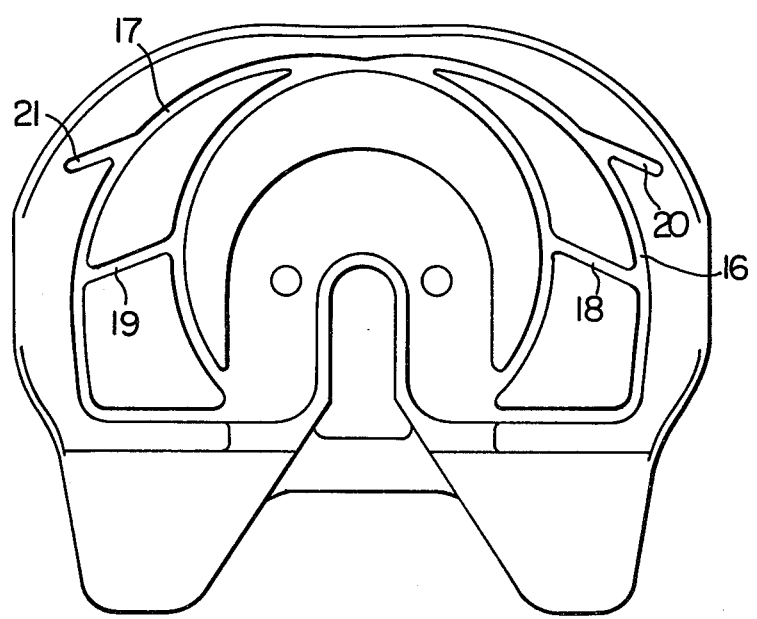

Referring now to FIG. 3 showing another embodiment of the invention, grooves 16 and 17 extend along Archimedes spiral curves centered at the axis of the pivot shaft. In addition, linear grooves 19, 20 and 18, 21 are connected to the groove 16 and 17, respectively, so as to extend away from the pivot shaft. Other portions of the second embodiment are materially indentical to those of the first embodiment.

Although not shown, one or more known units are provided on the lower face of the wheel plate 4 in each of the two embodiments, for supplying the groove with the lubricant. The grooves are communicated with such units by way of through hole or holes penetrating the wheel plate 4.

In operation of the first embodiment, as the trailer 1 is coupled to and tracted by the tractor 3, a sliding motion is caused between the lower face of the upper plate 2 and the upper face of the wheel plate 4 as a result of the relative pivotal movement between the trailer 1 and the tractor 3 produced when the tractor 3 is steered to the right and left. It is, therefore, necessary to suitably lubricate the sliding surfaces. In the first embodiment having the described construction, since the grooves 10 and 13 extend along involute curves, these grooves provide groove components tangential to circles of various radii centered at the axis of the pivoting, i.e. tangential to the direction of swinging of the lower face of the upper plate 2 at any radius from the axis of the pivot shaft. In other words, the grooves extend tangentially to almost all of the loci drawn by every portions of lower face of the upper plate at various radii from the axis 8 of the pivot shaft as the upper plate 2 pivot around the pivot shaft. The grooves 10, 13 and the main groove 15 of the wheel plate 4, overlain by the upper plate 2 as shown by one-dot-and-dash line, are charged with a viscous lubricant such as grease. The lubricant is spread from the grooves 10, 13 and the main grooves 15 into the gap between the sliding surfaces and is uniformly dispersed over the entire areas of the sliding surfaces to achieve a good lubricant.

In addition, since different portions of each groove are spaced from the axis of pivot shaft by different radii, these portions exhibit different moving speeds in the groove which, in turn, causes a sucking and discharging effects to promote the circulation of the lubricant in the groove, as will be understood from the following description.

Supposing here that the tractor 3 is steered to the left to cause a pivoting of the upper plate 2 to a position shown by two-dot-and-dash line, points A to F which have contacted the grooves in the wheel plate 4 before the upper plate 2 is pivoted are moved to points A' to F', respectively. The lubricant attaching to these points on the lower face of the upper plate 2, therefore, is taken out of the grooves accompanying these points of the lower face and is spread over the sliding surfaces. The same effect is obtained at every point on the lower face of the upper plate 2, so that sliding surfaces are uniformly lubricated over the entire area thereof.

The lubricant in the grooves as a whole is displaced to the right as the tractor is steered to the left. Since the peripheral speed is higher at the point C in the groove than at the point D because the radius $R_3$ at the point C is greater than that $R_1$ at the point D, the speed of movement of the lubricant is greater at the point C than at the point D so that a sucking effect is caused on the lubricant in the groove 10 to promote the rightward displacement of the lubricant in the groove 10. To the contrary, in the groove 13, the speed of movement of the lubricant at the point B is lower than that at the point A, so that the lubricant in the groove 13 is pressurized to move to the right. Since the grooves 10 and 13 are communicated with the main groove 15 at their ends 9, 11 and 12, 14, the lubricant discharged from the grooves 10 and 13 is returned again to these grooves through the main groove 15. Thus, as the tractor 3 is steered to the left and right, the lubricant in the grooves 10 and 13 is moved to the right and left alternatingly and repeatedly due to the sucking and discharging effects, so that the lubricant is smoothly circulated to prevent any breakage of the oil film.

In the embodiment shown in FIG. 3, the lubrication and circulation of the lubricant are performed in the same manner as those in the preceding embodiment having lubricant grooves formed along involute curves. In this embodiment, the circulation of the lubricant is further promoted by the linear grooves 18 and 19 which provide communication between the grooves 16 and 17 at the intermediate portions of the latter. In addition, the areas outside the convolution grooves 16 and 17 are lubricated by the lubricant supplied from the linear grooves 20 and 21.

As will be understood from the foregoing description, according to the invention, it is possible to promote the spreading and dispersion of the lubricant over the sliding surfaces and, hence, to attain a highly uniform lubrication, because the convolution grooves formed in the wheel plate 4 provide groove components tangential to the loci of the rotation of the upper plate 2 at every point on the latter.

Furthermore, since the grooves are formed in a convolution form such that successive portions of the groove have different radii from the axis of the pivot shaft, the sucking and discharging effects are caused to displace the lubricant in the grooves repetitionally to remarkably enhance the circulation of the lubricant.

According to the invention, therefore, it is possible to achieve a uniform lubrication between the wheel plate 4 and the upper plate 2 so that the undesirable breakage of the oil film in the coupling between the tractor 3 and the trailer is avoided to prevent seizure in the coupling. Consequently, a smooth operation of the coupling is ensured to contribute greatly to the safety of the trailer-tractor.

In the described embodiments, two convolution grooves are arranged in symmetry with each other with respect to the axis of symmetry plane of the wheel plate and grooves are formed along these curves. This arrangement, however, is not exclusive. Namely, the invention can employ various other numbers and forms of the grooves, provided that such numbers and forms offer the same advantages as those offered by the described embodiments. Other portions of the constructions of described embodiments can also be varied and modified without departing from the spirit or scope of the invention which is limited solely by the appended claims.

What is claimed is:

1. A wheel plate of a coupler for use in coupling a tractor and trailer, the wheel plate being adapted to be mounted on the tractor and including a sliding surface adapted to be brought into engagement with an upper plate secured to a lower side of the trailer during a coupling operation, and lubricating means for lubricating sliding surfaces in said coupler, said lubricating means including a main groove formed in a central portion of the sliding surface of said wheel plate so as to surround a recess means for accommodating a pivot shaft of said coupler, and a plurality of convolution grooves formed in said sliding surface of said wheel plate along convolution curves starting from and surrounding said main groove, each of said convolution grooves being communicated at both ends thereof with said main groove within said sliding surface of said wheel plate.

2. A wheel plate of a coupler for use in coupling a tractor and a trailer the wheel plate being adapted to be mounted on the tractor and including a sliding surface adapted to be brought into engagement with an upper plate secured to a lower side of the trailer during a coupling operation, lubricating means for lubricating sliding surfaces in said coupler, said lubricating means includes a main groove formed in a central portion of the sliding surface of said wheel plate so as to surround a recess means for accommodating a pivot shaft of said coupler, and a plurality of convolution grooves formed in said sliding surface of said wheel plate along convolution grooves starting from and surrounding said main groove, said convolution grooves being communicated at their ends with said main groove, and wherein said convolution grooves are formed in symmetry with each other with respect to an axis of symmetry plane of said wheel plate.

3. A wheel plate as claimed in one of claims 1 or 2, wherein said lubricating means further includes a plurality of linear grooves connected to said convolution grooves and extending therefrom in the direction opposite to said pivot shaft.

4. A wheel plate as claimed in claim 2, wherein said convolution curves are involute curves having a common base circle centered at a pivot axis of said pivot shaft.

5. A wheel plate as claimed in claim 2, wherein said convolution curves are spiral curves centered at a pivot axis of said pivot shaft.

* * * * *